(12) United States Patent
Gupta et al.

(10) Patent No.: US 9,037,887 B2
(45) Date of Patent: May 19, 2015

(54) ENERGY-EFFICIENT APPLICATION CONTENT UPDATE AND SLEEP MODE DETERMINATION

(71) Applicant: Intel Corporation, Santa Clara, CA (US)

(72) Inventors: Ajay G. Gupta, Portland, OR (US); Christian Maciocco, Portland, OR (US); Sameh Gobriel, Hillsboro, OR (US); Kristoffer D. Fleming, Chandler, AZ (US); Tsung-Yuan C. Tai, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 300 days.

(21) Appl. No.: 13/627,822

(22) Filed: Sep. 26, 2012

(65) Prior Publication Data

US 2014/0089702 A1 Mar. 27, 2014

(51) Int. Cl.
| | |
|---|---|
| *G06F 1/32* | (2006.01) |
| *G06F 1/00* | (2006.01) |
| *G06F 11/30* | (2006.01) |
| *G06F 17/30* | (2006.01) |

(52) U.S. Cl.
CPC .. *G06F 1/32* (2013.01); *G06F 1/00* (2013.01); *G06F 11/30* (2013.01); *G06F 1/3209* (2013.01); *G06F 17/30* (2013.01); *G06F 11/3006* (2013.01); *G06F 11/3055* (2013.01); *G06F 2201/81* (2013.01)

(58) Field of Classification Search
CPC ........... G06F 1/32; G06F 1/3209; G06F 8/65; H04W 52/02
USPC ............................ 713/320; 455/574; 717/168
See application file for complete search history.

(56) References Cited

U.S. PATENT DOCUMENTS

| | | | | |
|---|---|---|---|---|
| 5,546,538 | A * | 8/1996 | Cobbley et al. | 709/203 |
| 8,538,359 | B2 * | 9/2013 | Yen et al. | 455/127.5 |
| 2001/0029178 | A1 * | 10/2001 | Criss et al. | 455/419 |
| 2005/0076256 | A1 * | 4/2005 | Fleck et al. | 713/320 |
| 2006/0223504 | A1 * | 10/2006 | Ishak et al. | 455/414.1 |
| 2007/0106920 | A1 * | 5/2007 | Lee et al. | 713/320 |
| 2007/0236734 | A1 * | 10/2007 | Okamoto | 358/1.16 |
| 2009/0086660 | A1 * | 4/2009 | Sood et al. | 370/311 |
| 2009/0135751 | A1 * | 5/2009 | Hodges et al. | 370/311 |
| 2010/0250986 | A1 * | 9/2010 | Black et al. | 713/323 |

* cited by examiner

*Primary Examiner* — Chun Cao
(74) *Attorney, Agent, or Firm* — Schwabe Williamson & Wyatt PC

(57) ABSTRACT

Embodiments of methods, systems, and storage medium associated with are disclosed herein. In one instance, the method may include: first determining whether the computing device is connected to a network, based on a result of the first determining, monitoring data traffic between the computing device and the network, wherein the data traffic is associated with at least one application residing on the computing device, based on the monitoring, second determining whether the at least one application has been updated, and initiating a transition of the computing device to a sleep mode upon a result of the second determining that indicates that the at least one application has been updated. Other embodiments may be described and/or claimed.

22 Claims, 7 Drawing Sheets

ENERGY-EFFICIENT APPLICATION CONTENT UPDATE AND SLEEP MODE DETERMINATION

FIELD

Embodiments of the present disclosure generally relate to the field of data communication, and more particularly, to techniques for providing energy-efficient mechanism for updating content on open computer platforms.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

A key requirement for computing devices such as mobile platforms like Ultrabooks® or tablets platform is to be Always-On-Always-Connected (AOAC) at the applications and services level so the end-user is always connected to the network and may always be reachable. The mobile platforms are evolving to provide instant response to the user, instant connectivity, and keep the content refreshed, which may be done using pull-based or push-based mechanisms depending on network connectivity capabilities, e.g. AOAC using cellular networks such as a wireless wide area network (WWAN) or WiFi vs. occasionally connected platforms that use, for example, wired connection. Usually, platforms support pull-based mechanisms for occasionally connected platforms and push-based mechanisms for always connected platforms.

In order to update content such as email applications or social media applications residing on a platform (e.g., computing device), platforms which support pull-based mechanisms typically "wake up" for a certain amount of time, pull content from a content provider server and then go back to a "sleep" mode. The period of time during which a platform remains "awake" and fully powered to allow for content to be updated may have a significant impact on the battery life of the platform. On an open platform like a personal computer (PC), which may host one or more third party applications, determining which applications reside on the platform and which applications have finished updating and syncing their content may present a challenging problem. The problem may be further compounded by the fact that platform may be located in a thermally constrained environment, e.g. a bag or a car trunk, whereby the platform may not run for longer periods in order to avoid crossing permitted temperature thresholds.

Existing solutions to these problems have been to setup a static time-out such that a platform may stay active for the static time-out period of time regardless of the applications' update activity. This static time-out may be fairly long to cover most application content updates, ranging, for example, from short (e.g., 1-2 line) emails to long (e.g., 1-2 page) emails that may have attachments. Because of the long time-out period, the described solution may be energy inefficient, which may be a key drawback for computing devices such as, for example, mobile platforms supporting AOAC mode of operations.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Techniques described herein provide for energy-efficient updating content on platforms, including but not limited to open platforms (e.g., computing devices), using a network heuristics-based approach. A computing device may be determined to be in an active state, also known as "awake" mode characterized by, e.g., some power consumption by the device. The device may connect to a network (e.g., Internet, Wi-Fi, or other type of network) in order to have active applications (e.g., applications currently running on the device) updated. The active applications hosted by the device may be identified. Each identified active application may contact a respective content provider via the network connection so as to update content associated with the application. Data traffic associated with content updates may be monitored for one or more of the active applications. Content update completion for each active application may be inferred from the data traffic monitoring based on heuristically determined update time periods associated with one or more of the active applications. Once all content updates are presumed complete, the computing device may be put into a lower power "sleep" mode.

For example, inter-arrival times for data packets associated with data traffic for one or more of the active applications (e.g. an email application residing on a computing device) may be monitored. If inter-arrival times begin to exceed heuristically determined time period, it may be inferred that content update (e.g., email update) for the application(s) is complete. In another example, data throughputs through receiving ports of a computing device may be monitored. If throughputs are determined to be below a heuristically determined threshold for a determined period of time, it may be inferred that application update (e.g., media download) may be complete. In yet another example, the computing device may be kept in an "awake" mode for a heuristically determined time period that may ensure that one or more applications (e.g., social media applications) have been updated. The time periods and/or thresholds mentioned above may be predetermined based on testing of different network conditions, different application types, different computing devices, and the like.

Figure 1:
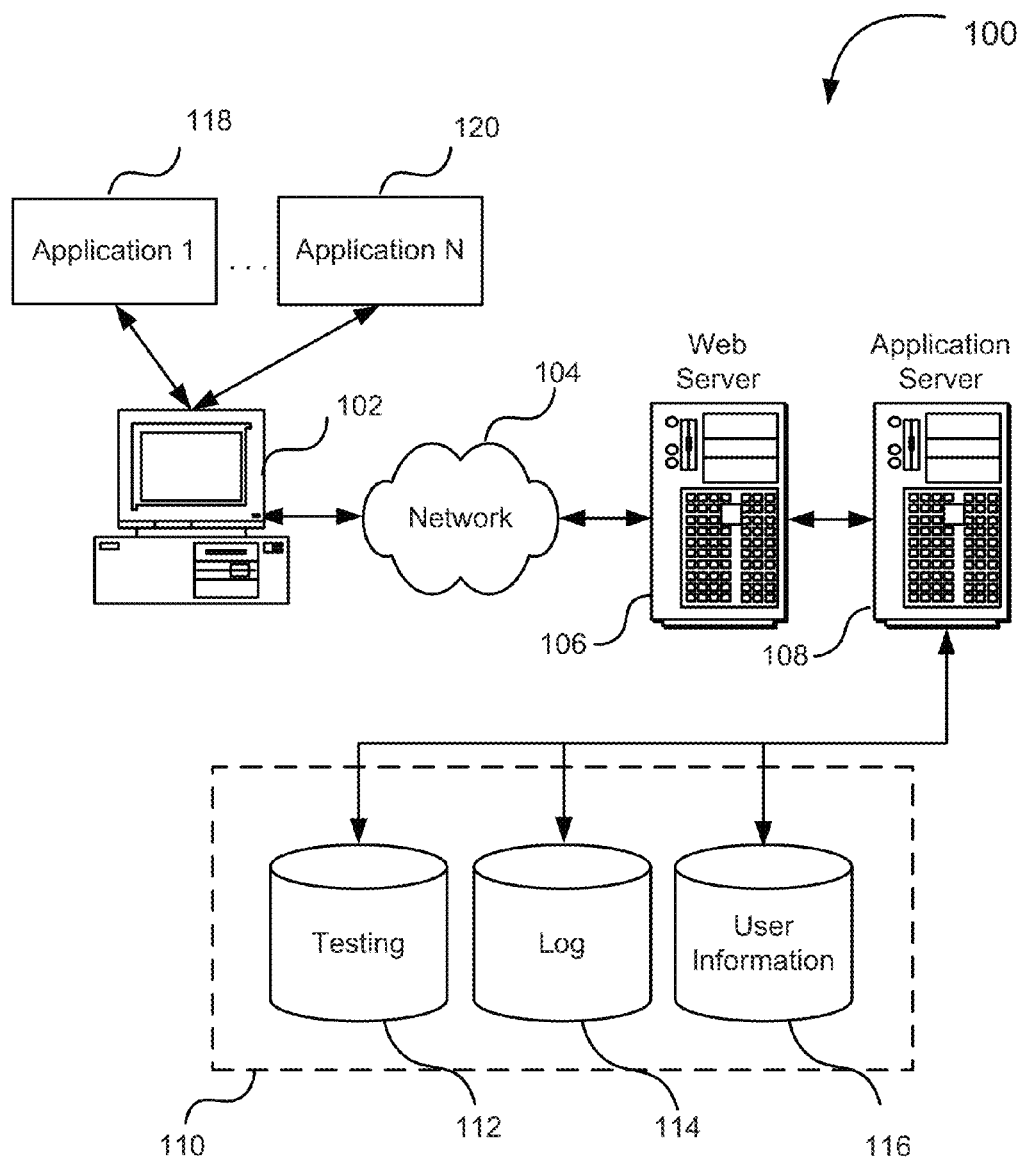
FIG. 1 illustrates an example environment in which energy-efficient content update for applications residing on a computing device may be implemented in accordance with various embodiments.

FIG. 1 illustrates an example of an environment 100 for implementing aspects of energy-efficient management for updating content for applications running on a computing device in accordance with various embodiments. As will be appreciated, although a Web-based environment is used for purposes of explanation, different environments may be used, as appropriate, to implement various embodiments. The environment 100 may include an electronic platform (computing device) 102, which may include any appropriate device operable to send and receive requests, messages, or information over an appropriate network 104 and convey information back to a user of the device. The network may include any appropriate network, including an intranet, the Internet, a cellular network, or any other such wired or wireless, private or public, local or wide area network or combination thereof. Protocols and components for communicating via such a network are well known and will not be discussed herein in detail. For example, for email applications, communication protocols such as Internet message access protocol (IMAP) or a Post Office Protocol (POP3) may be used. The examples of email applications may include, but are not limited to, Gmail®, Microsoft Hotmail®, Yahoo Mail®, Microsoft Outlook®, and the like. Other examples of applications may include social media applications, such as Twitter®, Facebook®, and the like. Yet other examples of applications may include applications configured to facilitate content (e.g., media) download. In the example illustrated in FIG. 1, the network may include the Internet, and the environment may include a Web server 106 for receiving requests, including requests for content update, from the computing device 118, and serving content in response thereto.

The illustrative environment may further include at least one application server 108 and a data store 110. The application server 108 may provide applications 118-120 residing on or otherwise associated with the computing device 102. The handling of all requests and responses, as well as the delivery of content, including content updates, between the client device 102 and the application server 108, may be handled by, e.g., Web server 106. It should be understood that the Web and application servers are not required and are merely example components, as structured code discussed herein may be executed on any appropriate device or host machine as discussed elsewhere herein.

The data store 110 may store testing data 112 and user information 116, which may be used, for example, to heuristically obtain time periods and thresholds for determining content update completion times for each application 118, 120 as will be described below in greater detail. The data store 110 may also include log data 114. The log data may include the data collected and stored as a result of data traffic monitoring and update completion times for the applications 118, 120 executing on the computing device 102. The log data 114 may be used to adjust or otherwise update the time periods and thresholds obtained heuristically from initial testing of various applications in different network conditions. The data store 110 may be operable, through logic associated therewith, to receive requests, such as content update requests, from the application server 108 and obtain, update, or otherwise process content in response thereto.

The environment in one embodiment may be a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the environment 100 in FIG. 1 should be taken as being illustrative in nature, and not limited to the scope of the disclosure.

Figure 2:
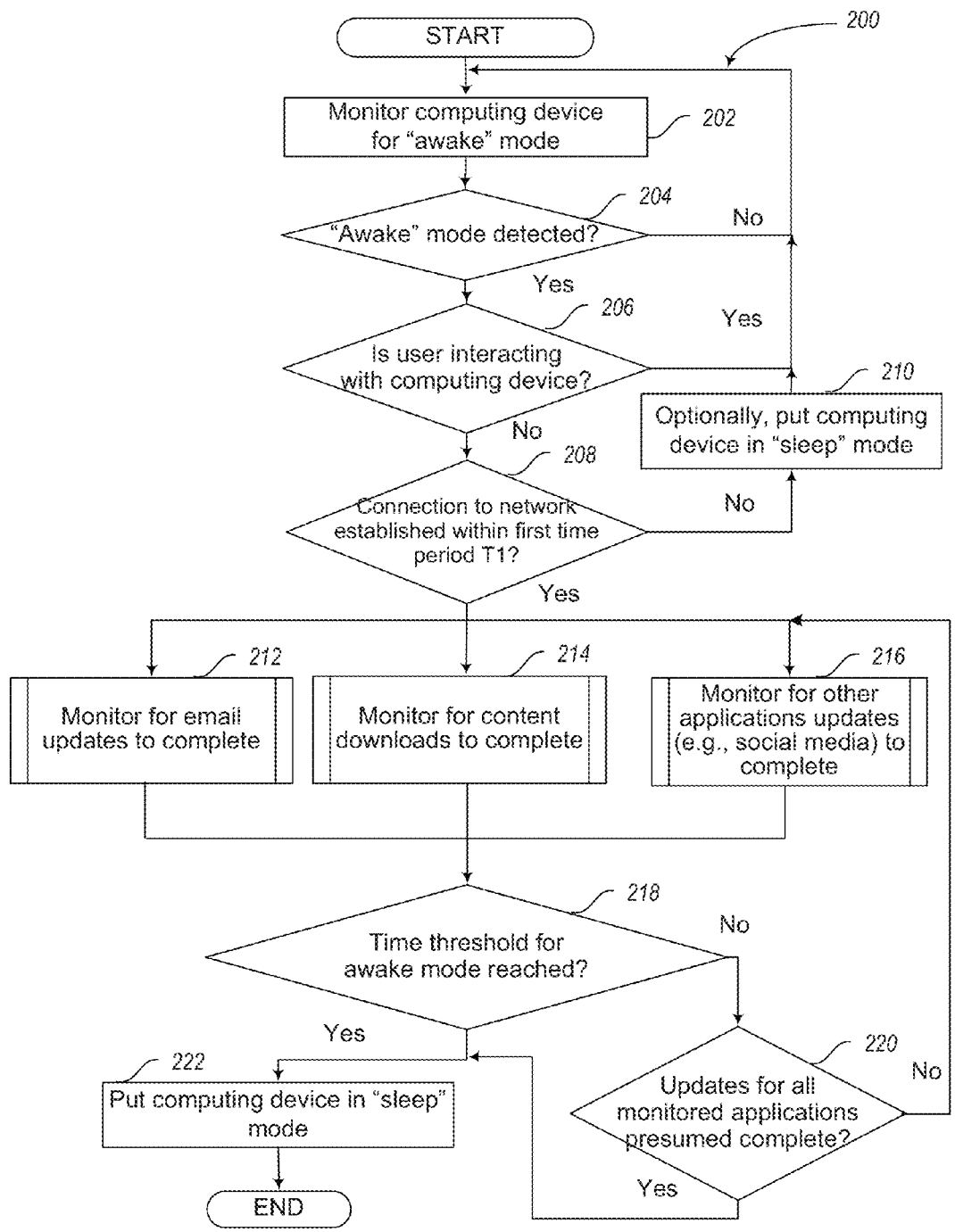
FIG. 2 illustrates a process flow diagram for managing energy-efficient content updates for applications residing on a computing device in accordance with various embodiments.

FIG. 2 illustrates a process flow diagram for operation of energy-efficient management for updating content for applications residing on a computing device as early described with reference to FIG. 1, in accordance with various embodiments. The process illustrated in FIG. 2 is but an example of implementation of the energy-efficient management for updating content; other processes or variations may be implemented depending on user devices and the concrete computing environment. The process 200 may begin at block 202, where a computing device may be monitored, e.g., by an application implementing the process 200 (which will be called hereinafter "process 200" for simplicity purposes), for transitioning from a low power state ("sleep" mode) to a full power state ("awake" mode). During the lower power state, one or more components of the computing device may be throttled back or powered down. In general, the lower power state consumes less power than the full power state.

At decision block 204, the process 200 may determine whether the "awake" mode is detected. If no such detection is determined, the process moves back to block 202 for continuous monitoring of the operational state of the computing device. If the transitioning of the computing device from the "sleep" mode to the "awake" mode is detected, at decision block 206 it may be determined whether the device is accessed by a user. For example, the user may move a mouse, access a keyboard associated with the device, touch the device screen (if the screen is touch-sensitive), turning on audio, pressing power button or otherwise access the device thereby causing the device to transition from the "sleep" to "awake" mode. If it is determined that the user is interacting with the device, there is no need to manage content updates as the device may be in an "awake" mode for a duration of a user session with the device and content updates for active applications are likely to complete during the user session.

If no user interaction with the computing device is detected, the process 200 may determine at decision block 208 whether the device has established a connection to a network (e.g., Internet) within a predetermined time period T1. For example, the process 200 may determine whether the device has acquired an Internet Protocol (IP) address within the time period T1. If it is determined that a network connection has not been established within the time period T1, the process 200 may move to block 210, where optionally the computing device may be put back in the "sleep" mode, after which the process 200 may move back to block 202.

If the process 200 determines that a connection to a network has been established within the time period T1, the process 200 may start routines 212, 214, and 216 in parallel or substantially simultaneously. More specifically, routine 212 may implement content update monitoring and completion detection for email applications, routine 214 may implement content update monitoring and completion detection for content (e.g., media) download applications, and routine 216 may implement content update monitoring and completion detection for social media applications.

Figure 3:
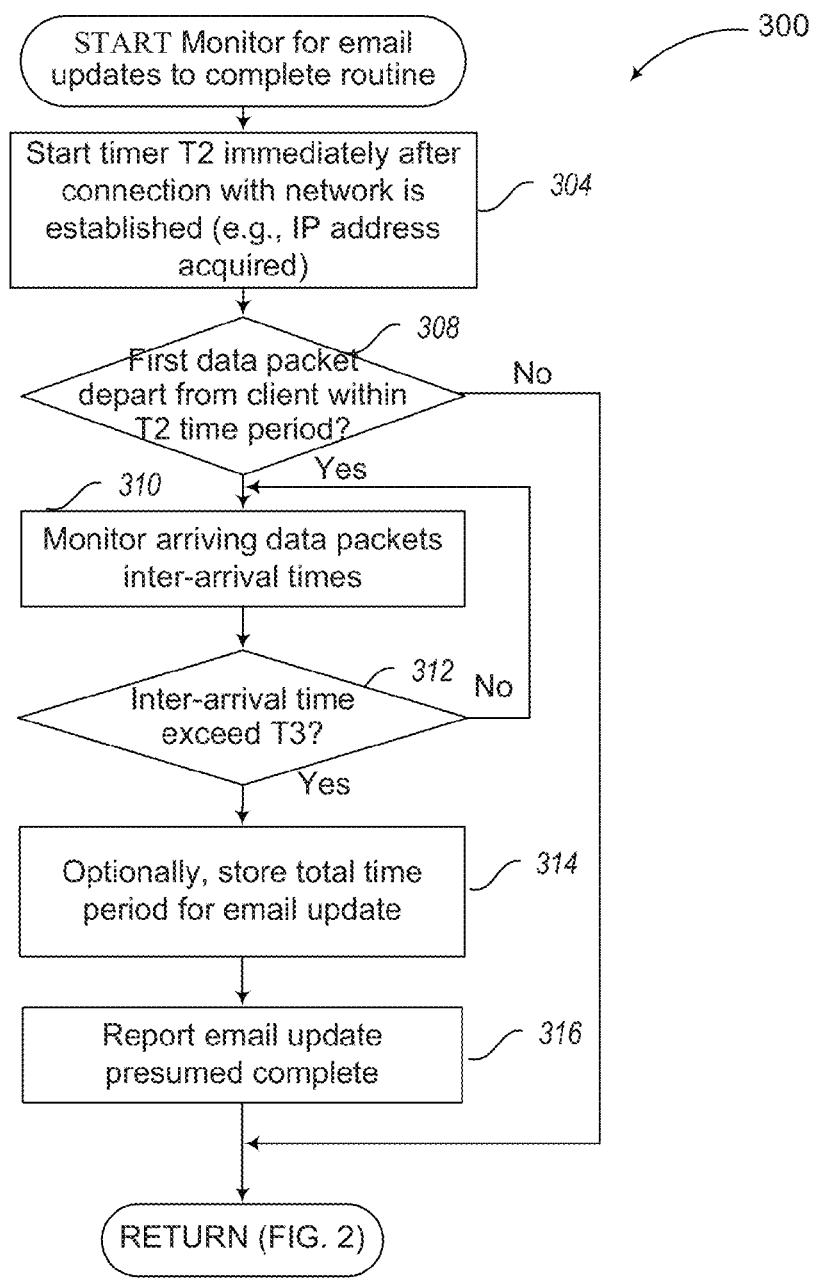
FIG. 3 illustrates another process flow diagram for monitoring for completion of content updates of an email application in accordance with various embodiments.
Figure 4:
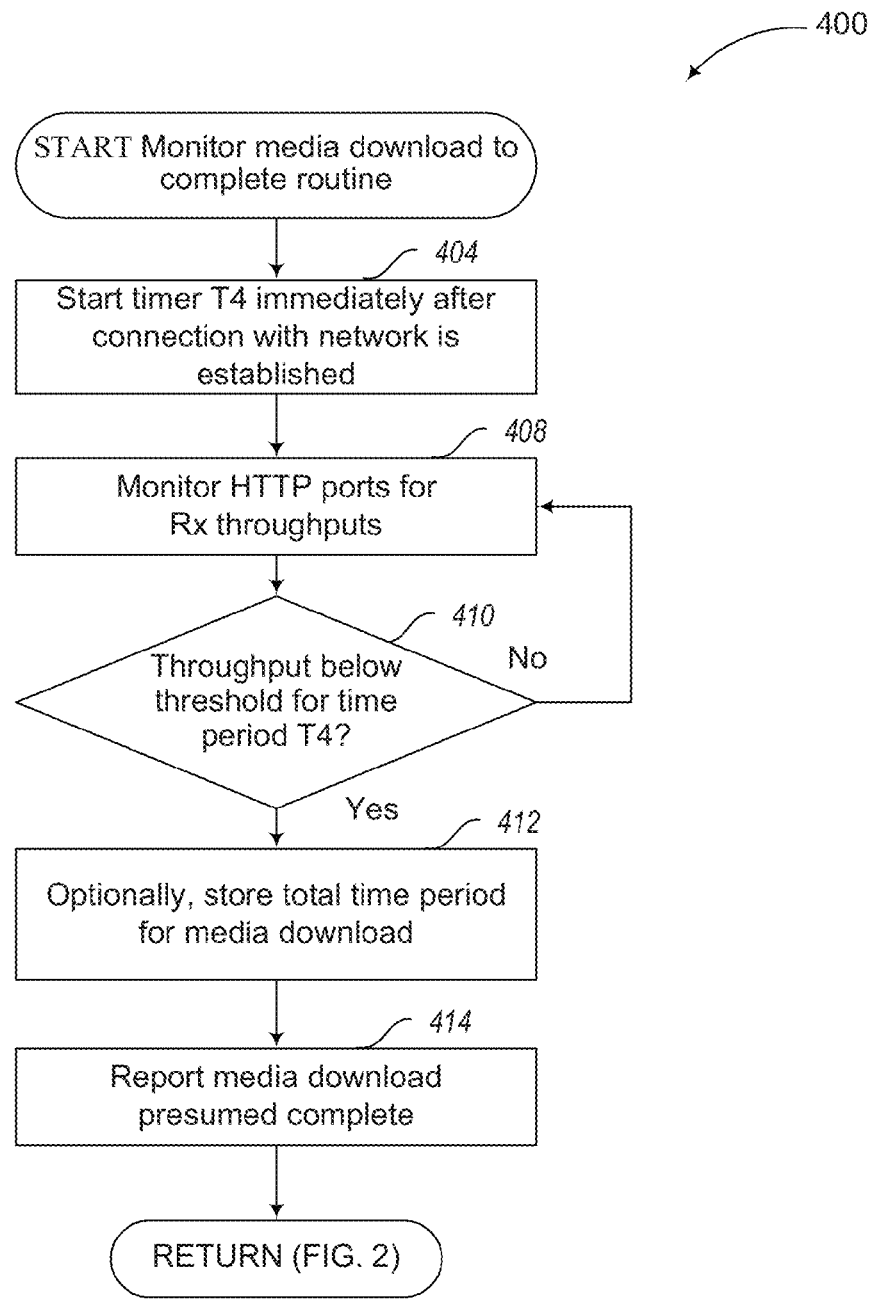
FIG. 4 illustrates a routine for monitoring for updates completion for different applications in accordance with various embodiments.
Figure 5:
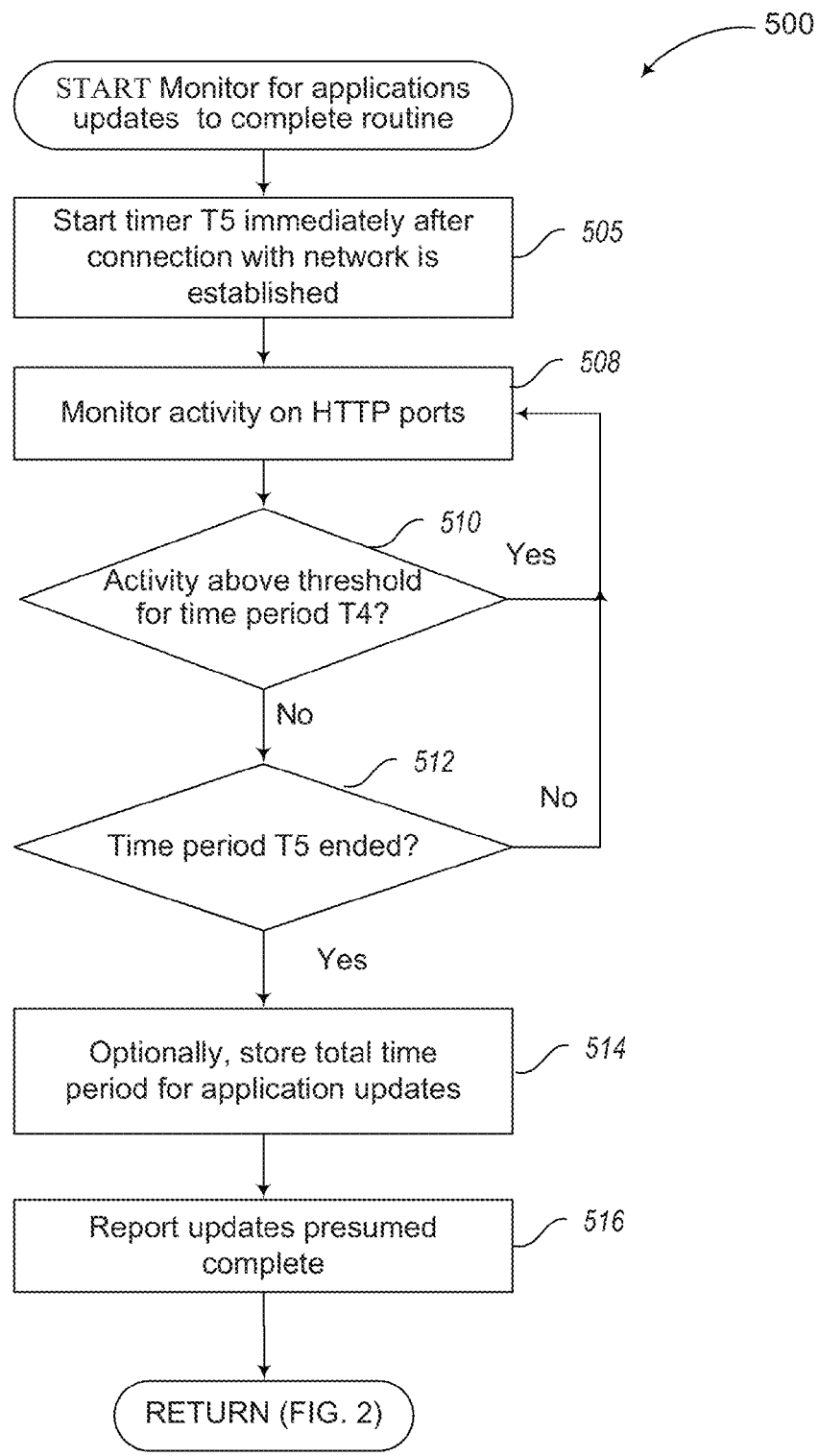
FIG. 5 illustrates another routine for monitoring for updates completion for different applications in accordance with various embodiments.

The routines 212, 214, and 216 are illustrated in FIGS. 3, 4, and 5, and are described below in greater detail. The process 200 may periodically call one or more routines 212, 214, 216 in order to check the status of content updates for particular applications. For example, the process 200 may force-complete those of routines 212, 214, 216 that are executing at a time when a predetermined time threshold for awake mode (if any) for the computing device is reached, as discussed in reference to block 218 below.

At decision block 218, the process 200 may determine whether a predetermined time threshold for a computing device in the "awake" mode has been reached. If the time threshold for the "awake" mode has not been reached, the process 200 may move to decision block 220 to determine whether all monitored application updates have been completed or are presumed complete, based on the information provided by the routines 212, 214, and 216. If not all of the updates have been completed, the process 200 may move back to at least those of the routines 212, 214, or 216, in which the content updates have not been completed. If the process 200 determines at block 218 that the time threshold for "awake" mode has been reached or the process 200 determines at block 220 that all updates have been completed, the process 200 may, at block 222, facilitate putting the computing device back in a low power "sleep mode."

FIG. 3 is a process flow diagram illustrating a routine 300 for monitoring for completion of content updates of an email application in accordance with various embodiments. As described above, the routine 300, referenced in FIG. 2 by block 212, may begin after a connection between a computing device and a network is established (FIG. 2, block 208). At block 304, the routine 300 may start a timer T2 immediately after the connection with the network is established (e.g., IP address is acquired). The timer T2 may define a predetermined time period within which the process may monitor the device ports for a first data packet departing from the computing device via the network connection in accordance with known email communication protocols (e.g., POP3 or IMAP). In an enterprise environment, when computing devices may connect to a network (e.g., enterprise intranet) via a virtual private network (VPN), it may sometimes take time for the VPN to connect to the VPN gateway. In such scenarios, when the VPN is not yet connected, the first packet from email client to the email server may not reach the email server, as the email server may not be reachable. Accordingly, additional delays may be heuristically determined and included in the time period T2 to accommodate email applications to connect with the email server.

Detecting a first data packet transmitted from the computing device may allow for determining that there is in fact an email application that is active on the computing device. Accordingly, the routine 300 may determine, at decision block 308, whether a first data packet departed with one of the monitored ports within the predetermined time period T2. If no data packets are detected, the routine 300 may return to FIG. 2 as indicated by a "No" branch exiting block 308.

If a data packet departed from one of the monitored ports is detected within the time period T2, the routine 300 may move to block 310. At block 310, email activity may be monitored and, based on the monitoring results, it may be deduced that email syncing on the computing device is completed. For example, inter-arrival times for arriving data packets may be monitored for known ports on the computing device. More specifically, inter-arrival times may be monitored for exceeding a predetermined time threshold. Thus, if there is no data packet received for a predetermined time threshold, it may be inferred that the email sync is complete. This inference may be based on a heuristic determination that for high percentage of cases, if there are any email updates to be done for a particular email application residing on the computing device, there may be network activity such that packet inter-arrival times remain below certain threshold. Accordingly, if the routine 300 determines at decision block 312 that inter-arrival times for arriving data packets begin to exceed a predetermined threshold T3, it may be inferred that the email update activity has ceased and the email update is complete.

The routine 300 may then store, at block 314, a value of a total time period needed for the email application update (sync-up). The stored time period may be used for further heuristic adjustments of timers T2 and threshold T3, for example. The routine 300, at block 316, may then report (e.g., to the process 200 of FIG. 2) that the application email update is complete.

FIG. 4 is a process flow diagram illustrating a routine 400 for monitoring for updates completion for different applications in accordance with various embodiments. The applications may include ones configured to facilitate content (e.g., media) download via a network, e.g., Internet. In particular, routine 400 may provide for monitoring content (e.g., media) downloads to complete, as referenced by block 214 in FIG. 2. At block 404, the routine 400 may start a timer T4 immediately after the connection of the computing device with the network has been established (e.g., after the computing device has acquired IP address). The timer T4 may define a predetermined time period within which the process may monitor the device ports, such as HTTP/HTTPS ports for average received data (Rx) throughputs, as indicated by block 408. Based on average Rx throughput on those ports it may be ascertained whether content download is happening or not and if network throughput drops below a certain threshold it may be deduced the content download has stopped.

Accordingly, the routine 400 may determine, at decision block 410, whether average data throughput remains below a certain threshold (e.g., N bps). If the average data throughput is determined to be above the threshold N, it may be inferred that content downloading, is occurring and the routine 400 may move to block 408. If the data throughput is determined to be below the threshold N for a continuous period of time T4, it may be inferred that the content download is complete. Accordingly, the routine 400 may store, at block 412, a value of a total time period needed for the content download to complete. The stored time period may be used for further heuristic adjustments of timers T4 and threshold N, for example. The routine 400, at block 414, may then report (e.g., to the process 200 of FIG. 2) that the content download is complete.

FIG. 5 is a process flow diagram illustrating another routine 500 for monitoring for content update completion for different types of applications in accordance with various embodiments. In particular, routine 500 may provide for monitoring for social media updates to complete, as referenced by block 216 in FIG. 2. At block 504, the routine 500 may start a timer T5 immediately after the connection of the computing device with the network has been established (e.g., after the computing device has acquired IP address). The timer T5 may define a predetermined time period within which the process may monitor the device ports, such as HTTP/HTTPS ports for average received data (Rx) throughputs, as indicated by block 508. As discussed above, based on average Rx throughput on those ports it may be ascertained whether certain activities related to active applications residing on the computing device are taking place. For example, as discussed above, it may be ascertained whether content download is happening or not. If network throughput drops below a certain threshold it may be deduced the download has stopped.

Accordingly, the routine 500 may determine, at decision block 510, whether average data throughput remains below a certain threshold (e.g., M bps). If the average data throughput is determined to be above the threshold M, it may be inferred that certain type of activity, such as content downloading, is occurring and the routine 500 may move to block 508. If the data throughput is determined to be below the threshold M, e.g., for a continuous period of time T4 as discussed in reference to FIG. 4, it may be inferred that the content download is complete. However, it may be further inferred that other types of activity, e.g., social media application updates, are still happening.

Accordingly, the activity below a certain threshold M may keep occurring for duration of the timer T5, as indicated by decision block 512. If the timer T5 has run, the routine 500 may store, at block 512, a value of a total time period needed for the social media application updates to complete. The stored time period may be used for further heuristic adjustments of timers T5 and threshold M, for example. The routine 500, at block 516, may then report (e.g., to the process 200 of FIG. 2) that the application updates are complete. In an embodiment, the threshold value M may be substantially equal to the threshold value N described above in reference to FIG. 4.

Figure 6:
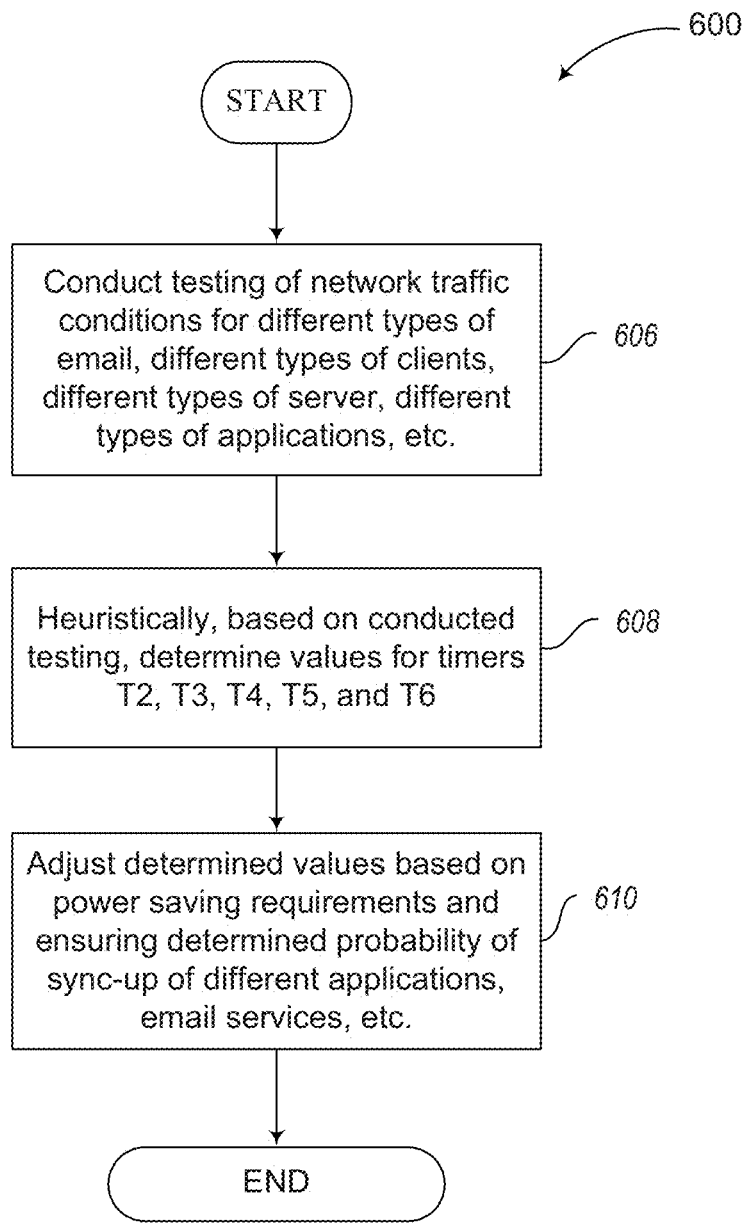
FIG. 6 illustrates a process flow diagram for heuristic determination of values of timers and data throughput thresholds used in processes illustrated in FIGS. 2-5 in accordance with various embodiments.

FIG. 6 is a process flow diagram illustrating a process 600 for heuristic determination of values of timers and data throughput thresholds used in processes described in FIGS. 2-5 in accordance with various embodiments. The values for time periods (and corresponding timers) T1-T5 may be heuristically determined as described by the process 600, for example, by testing network traffic conditions as indicated by block 606.

For example, for email application content updates, network traffic may be analyzed, for example, offline, by setting POP3 or IMAP as the email protocol and using different applications (e.g. Gmail®, Hotmail®, Live Mail®) and analyzing email traffic. The email traffic may be analyzed under following conditions: monitor and test traffic over wired network or Wi-Fi; monitor and test inter-arrival packet times for "low" volume of traffic, "medium" volume of traffic, and "high" volume of traffic; and monitor and test inter-arrival packet times for aperiodic traffic. What constitutes "low," "medium," or "high" volume of traffic may be application dependable, and/or configurable, in accordance with various metrics, such as, but not limited to, "messages or packets per unit of time."

Microsoft Outlook® may be tested with various protocols, such as IMAP or POP3, as described above. With Microsoft Exchange® server, Microsoft Outlook® may be also tested in intranet conditions, such as when a tested computing device is directly connected to corporate network and remotely logins via VPN to replicate mobile user scenarios of end user travelling.

The network traffic may be also analyzed for different applications, such as web based Gmail®, Yahoo Mail®, Microsoft Hotmail®, Microsoft Live Mail®, Microsoft Outlook® to ascertain how frequently these applications may poll the email servers to pull traffic to differentiate between the case when email sync was done as opposed to the case when the application is contacting the server next time to download email.

High volume of traffic may pertain to an application or computing device that sends and receives, e.g., 500 emails a day or about 60 emails per hour, on average an email per minute. In practice, high volume of traffic may occur in a form of email bursts followed by longer lull periods. Medium volume of traffic may pertain to an application or computing device that sends and receives about 100-200 emails a day or an email once every 3-5 minutes on average. Low volume of traffic may be defined as approximately one email every two minutes.

Based on the network traffic analysis, the values for timers pertaining to email application updates described in reference to FIG. 3 may be obtained, as indicated by block 608. For example, inter-arrival packet times may be obtained based on the testing of network conditions described above. More specifically, the testing may show that whenever email server has any traffic, and email application is downloading emails from server, the inter-arrival packet times may be below 10 seconds. It has been noted that inter-arrival times may vary between 5 to 10 seconds depending on networking conditions, link speed, link reliability etc. When the email server does not have any email, no traffic may occur till the email application may poll the server again. It has been also noted that different clients may poll the email server at different rates, such as once a minute, once in two minutes, or more. Accordingly, the timer values may be chosen to be much lower than typical polling rates of email applications.

The obtained values for the timers may be adjusted, as indicated by block 610. The adjustments may be made such that the determined timer values may be short enough so that it may be inferred that application email updates were done and the computing device may be put to a "sleep" mode fast enough to save power. The determined timer values may ensure, with a high probability (e.g., about 90-95%) that the email application(s) were really synced up to account for variable network conditions. The obtained values for the timers may be further adjusted based on the results of the various applications content updates managed as described in reference to FIGS. 2-5. For example, total time periods of application updates stored as indicated by blocks 314, 412, and 514 in FIGS. 3, 4, and 5 respectively may be used to further adjust corresponding timer values. The timer and threshold values described in reference to FIGS. 4-5 may be obtained heuristically using a similar approach to testing and monitoring network traffic for particular applications. In one example, the timer may be updated starting from statically preset timers values for media download applications or social media applications. The download rate, the inter-packet gap, and he content size (when content is updated) may be monitored and an exponential moving average (EMA) filter may be applied to converge toward a dynamic timer value for these types of content.

Figure 7:
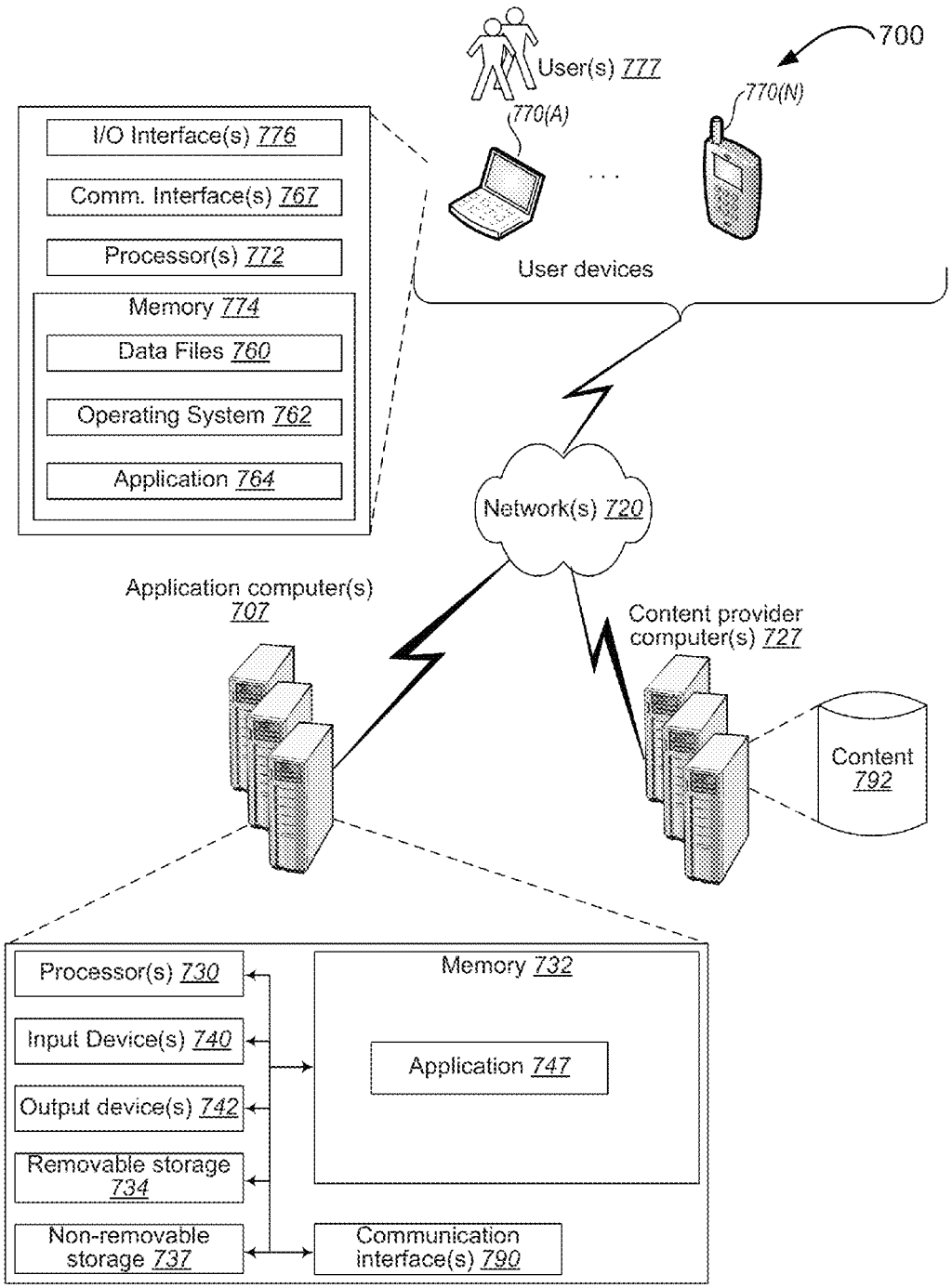
FIG. 7 illustrates an environment in which various embodiments of computing system configured to provide energy-efficient content update for applications residing on a computing device may be implemented.

FIG. 7 illustrates an example environment (e.g., system) 700 suitable for implementing energy-efficient content update for applications residing on a computing device described herein in accordance with various embodiments. As will be appreciated, although a Web-based environment is used for purposes of explanation, different environments may be used, as appropriate, to implement various embodiments. The environment 700 may include computing (user) devices 770(A)-770(N) of various users 777, one or more devices 770(A)-770(N) may be associated with each user 777. Various devices 770(A)-770(N) may include computing devices equipped as earlier described with reference to FIG. 1, and operable to update content associated with various applications residing on the devices 770(A)-770(N), over an appropriate network 720. Each one of devices 770(A)-770(N) may include a processor 772 and memory 774 for storing processor-executable instructions, such as data files 760, operating system 762, and one or more applications 764, such as email applications, content download applications, social media applications, and the like.

Each one of devices 770(A)-770(N) may further include at least one or both of the following elements: input/output interface 776 designed to enable peripheral component interaction with the system 700 and communication interface 767. In various embodiments, the input/output interface 776 may include, but is not limited to, a display, e.g., a liquid crystal display, a touch screen display, etc., a speaker, a microphone, a video camera, and/or other components. For embodiments including a display supporting touch screen features, the system 700 may include a touch screen controller for facilitating control of the display. Operating system 762 and/or application(s) 764 may include software components configured, when executed on the processor 772, to cause the system 700 to perform one or more operations enabling energy-efficient content update mechanisms for computer devices 770(A)-770(N) as described in reference to FIGS. 1-6.

Examples of computing devices 770(A)-770(N) may include, but are not limited to, smartphones, computing tablets, ultrabooks, e-readers, laptop computers, desktop computers, set-top box, game consoles, personal digital assistants, and so forth.

The network 720 may include any appropriate network or networks, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network may be enabled by wired or wireless connections, and combinations thereof. In one example, the illustrative environment 700 may be configured to provide the capabilities described in reference to FIGS. 1-6 using devices 770(A)-770(N) that may be connected through a network described above, to application computers 707 and content provider computers (e.g., servers) 727.

The content provider servers 727 may be configured to receive requests and serve content in response thereto, although for other networks, an alternative device serving a similar purpose could be used, as would be apparent to one of ordinary skill in the art. The application computers (e.g., servers) 707 may include one or more processors 730, input devices 740, output devices 742 (e.g., administrative input/output devices), removable storage 734, and non-removable storage 737 that may be connected to a communication interface 790 and memory 732. In one embodiment, one or more applications 747 may include email applications, content download applications, social media applications, and the like. Applications 747 may reside on the server 707 and execute thereon. In alternate embodiments, applications 747 may execute partly on the device 777 and partly on the server 707. Accordingly, the memory 732 may include application module 747 or server-side of application module 747.

The handling of all requests and responses, for example, the requests for content updates initiated by the applications 764 and/or 747 as well as the delivery of content between the devices 770(A)-770(N) and the application server 707, may be handled by one or more content provider Web servers 727. The content data store 792 may be associated with the server 727. The data store 792 may be operable, through logic associated therewith, to receive instructions from the server 727 and obtain, update, or otherwise process data in response thereto. In an embodiment, the data store 792 may store testing data associated with heuristic determination of timer values necessary to enable energy-efficient application updates as described in reference to FIGS. 1-6. In an embodiment, content provider servers 727 and/or application servers 707 may be used for testing network 720 traffic conditions as described in reference to FIG. 6.

Each server may include an operating system that provides executable program instructions for the general administration and operation of that server, and typically may include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment 700 may include a variety of data stores and other memory and storage media as discussed above. These may reside in a variety of locations, such as on a storage medium local to (and/or resident in) one or more of the computers or remote from any or all of the computers across the network. Any necessary files for performing the functions attributed to the computers, servers, or other network devices may be stored locally and/or remotely, as appropriate. The storage media may include disk drives, optical storage devices, and solid-state storage devices, such as random access memory (RAM) or read-only memory (ROM), flash memory or other memory technology, CD-ROM, digital versatile disk (DVD) or other optical storage, magnetic cassettes, magnetic tape, magnetic disk storage or other magnetic storage devices, as well as removable media devices, memory cards, flash cards, or any other medium which may be used to store the desired information and which may be accessed by a processor.

The environment (system) 700 may be a distributed interaction environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature, and not limited to the scope of the disclosure.

According to various embodiments, the present disclosure describes a computing device-readable storage medium having instructions stored thereon that, in response to execution by a computing device, cause the computing device to determine whether a first computing device is connected to a network and, based on a result of the determining, monitor data traffic between the first computing device and the network, where the data traffic associated with at least one application resides on the first computing device. Based on the monitoring data traffic, the computing device may determine whether the at least one application has been updated with content provided by the data traffic and initiate a transition of the first computing device to a sleep mode upon a result of the second determine indicating that the at least one application has been updated with the content.

The instructions, in response to execution by the computing device, may further cause the computing device to detect that a first computing device is in an awake mode. The instructions may further cause the computing device to monitor inter-arrival times for data packets associated with the data traffic and determine that the at least one application has been updated when the inter-arrival times exceed a first threshold.

The instructions that cause the computing device to monitor data traffic between the first computing device and the network, in response to execution by the computing device, may further cause the computing device to monitor inter-arrival times for data packets associated with the data traffic, and determine that the at least one application has been updated when the inter-arrival times exceed a first threshold. The computing device may include the first computing device. Any combination of the above features may be contemplated.

The application may include an email application. The instructions, in response to execution by the computing device, may further cause the computing device to monitor inter-arrival times for data packets associated with the data traffic according to a communication protocol. The communication protocol may be selected from an Internet message access protocol (IMAP) or a Post Office Protocol (POP3).

The instructions that cause the computing device to monitor data traffic between the first computing device and the network, in response to execution by the computing device, further cause the computing device to measure data throughput for the data traffic and determine that the at least one application has been updated when the data throughput is measured to be below a second threshold over a first time period. The application may include a content download application.

The instructions that cause the computing device to monitor data traffic between the first computing device and the network, in response to execution by the computing device, may further cause the computing device to measure data throughput for the data traffic, determine that the data throughput is below a second threshold, and determine that the at least one application has been updated after a second time period has run out. The application may include a social media application.

The instructions that cause the computing device to determine whether a first computing device is connected to a network, in response to execution by the computing device, may further cause the computing device to determine whether the first computing device acquired an Internet Protocol (IP) address during a third time period.

According to various embodiments, the present disclosure describes a processor and an energy-efficient content update associated application operated by the processor to determine whether the computing device is connected to a network and based on a result of the first determine, monitor data traffic between the computing device and the network. The data traffic providing content may be associated with at least one application residing on the computing device. Based on the monitoring, the energy-efficient content update associated application may be further operated by the processor to determine whether the at least one application has been updated with the provided content, and initiate transition of the computing device to a sleep mode upon a result of the second determine indicating that the at least one application has been updated. The energy-efficient content update associated application is further operated by the processor to detect that the computing device is in an awake mode.

The energy-efficient content update associated application may be further operated by the processor to monitor inter-arrival times for data packets associated with the data traffic and determine that the at least one application has been updated when the inter-arrival times exceed a first threshold. The first threshold may be heuristically determined based on results of testing of network data traffic associated with the application. The application may include an email application.

The energy-efficient content update associated application may be further operated by the processor to measure data throughput for the data traffic and determine that the at least one application has been updated when the data throughput is measured to be below a second threshold over a first time period. The second threshold and the first time period may be heuristically determined based on results of testing of network data traffic associated with the application. The application may include a content download application. Any combinations of above features of the energy-efficient content update associated application operated by a processor may be contemplated.

According to various embodiments, the present disclosure describes a computer-implemented method comprising determining, with a computing device, whether the computing device is connected to a network, and, based on a result of the determining, monitoring, with the computing device, data traffic between the computing device and the network. The data traffic associated with at least one application may reside on the computing device. Based on the monitoring, the method may include determining, with the computing device, whether the application has been updated, and initiating, with the computing device, a transition of the computing device to a sleep mode upon a result of the determining indicating that the application has been updated. The method may further include, with the computing device, prior to the determining whether the computing device is connected to a network, detecting that the computing device is in an awake mode. The method may further include monitoring, with the computing device, inter-arrival times for data packets associated with the data traffic, and determining, with the computing device, that the application has been updated when the inter-arrival times exceed a first threshold.

The method may further include measuring, with the computing device, data throughput for the data traffic, and determining, with the computing device, that the application has been updated when the data throughput is measured to be below a second threshold over a first time period. The method may further include measuring, with the computing device, data throughput for the data traffic, determining, with the computing device, that the data throughput is below a second threshold, and determining, with the computing device, that the application has been updated after a second time period has run out.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein, limited only by the claims.

What is claimed is:

1. One or more non-transitory computer-readable storage media comprising instructions that, in response to execution by a computing device, cause the computing device to:
   first determine whether a first computing device is connected to a network;
   based on a result of the first determine, monitor data throughput for data traffic between the first computing device and the network, the data traffic associated with at least one application residing on the first computing device;
   based on the monitor of the data throughput, second determine whether the at least one application has been updated with content provided by the data traffic; and
   initiate a transition of the first computing device to a sleep mode upon a determination that the at least one application has been updated with the content.

2. The one or more non-transitory computer-readable storage media of claim 1, wherein the instructions, in response to execution by the computing device, further cause the computing device to, prior to the first determine, detect that a first computing device is in an awake mode.

3. The one or more non-transitory computer-readable storage media of claim 1, wherein the computing device includes the first computing device.

4. The one or more non-transitory computer-readable storage media of claim 1, wherein the instructions, in response to execution by the computing device, further cause the computing device to:
monitor inter-arrival times for data packets associated with the data traffic; and
determine that the at least one application has been updated when the inter-arrival times exceed a first threshold.

5. The one or more non-transitory computer-readable storage media of claim 4, wherein the at least one application includes an email application.

6. The one or more non-transitory computer-readable storage media of claim 4, wherein the instructions, in response to execution by the computing device, further cause the computing device to monitor inter-arrival times for data packets associated with the data traffic according to a communication protocol.

7. The one or more non-transitory computer-readable storage media of claim 6, wherein the communication protocol is selected from an Internet message access protocol (IMAP) or a Post Office Protocol (POP3).

8. The one or more non-transitory computer-readable storage media of claim 1, wherein the instructions, in response to execution by the computing device, further cause the computing device to:
determine that the at least one application has been updated when the data throughput is measured to be below a second threshold over a first time period.

9. The one or more non-transitory computer-readable storage media of claim 8, wherein the at least one application includes a content download application.

10. The one or more non-transitory computer-readable storage media of claim 1, wherein the instructions, in response to execution by the computing device, further cause the computing device to:
determine that the data throughput is below a second threshold; and
determine that the at least one application has been updated after a second time period has run out.

11. The one or more non-transitory computer-readable storage media of claim 10, wherein the at least one application includes a social media application.

12. The one or more non-transitory computer-readable storage media of claim 1, wherein the instructions that cause the computing device to first determine whether a first computing device is connected to a network, in response to execution by the computing device, further cause the computing device to determine whether the first computing device acquired an Internet Protocol (IP) address during a third time period.

13. A computing device comprising:
a processor; and
an energy-efficient content update associated application operated by the processor to:
first determine whether the computing device is connected to a network;
based on a result of the first determine, monitor inter-arrival times for data packets associated with data traffic between the computing device and the network, the data traffic providing content associated with at least one application residing on the computing device;
based on the monitor, second determine whether the at least one application has been updated with the provided content when the inter-arrival times exceed a first threshold that is heuristically determined based on results of testing of network data traffic associated with the at least one application; and
initiate transition of the computing device to a sleep mode upon a determination that the at least one application has been updated.

14. The computing device of claim 13, wherein the energy-efficient content update associated application is further operated by the processor to:
detect that the computing device is in an awake mode.

15. The computing device of claim 13, wherein the at least one application includes an email application.

16. The computing device of claim 13, wherein the energy-efficient content update associated application is further operated by the processor to:
measure data throughput for the data traffic; and
determine that the at least one application has been updated when the data throughput is measured to be below a second threshold over a first time period.

17. The computing device of claim 16, wherein the at least one application includes a content download application.

18. The computing device of claim 16, wherein the second threshold and the first time period are heuristically determined based on results of testing of network data traffic associated with the at least one application.

19. A computer-implemented method comprising:
first determining, with a computing device, whether the computing device is connected to a network;
based on a result of the first determining, monitoring, with the computing device, inter-arrival times for data packets associated with data traffic between the computing device and the network, the data traffic associated with at least one application residing on the computing device;
based on the monitoring, second determining, with the computing device, whether the at least one application has been updated when the inter-arrival times exceed a first threshold; and
initiating, with the computing device, a transition of the computing device to a sleep mode upon a determination that the at least one application has been updated.

20. The computer-implemented method of claim 9, further comprising:
detecting, with the computing device, prior to the first determining, that the computing device is in an awake mode.

21. The computer-implemented method of claim 19, further comprising:
measuring, with the computing device, data throughput for the data traffic; and
determining, with the computing device, that the at least one application has been updated when the data throughput is measured to be below a second threshold over a first time period.

22. The computer-implemented method of claim 19, further comprising:
measuring, with the computing device, data throughput for the data traffic; and
determining, with the computing device, that the data throughput is below a second threshold; and
determining, with the computing device, that the at least one application has been updated after a second time period has run out.

* * * * *